Figure 1:
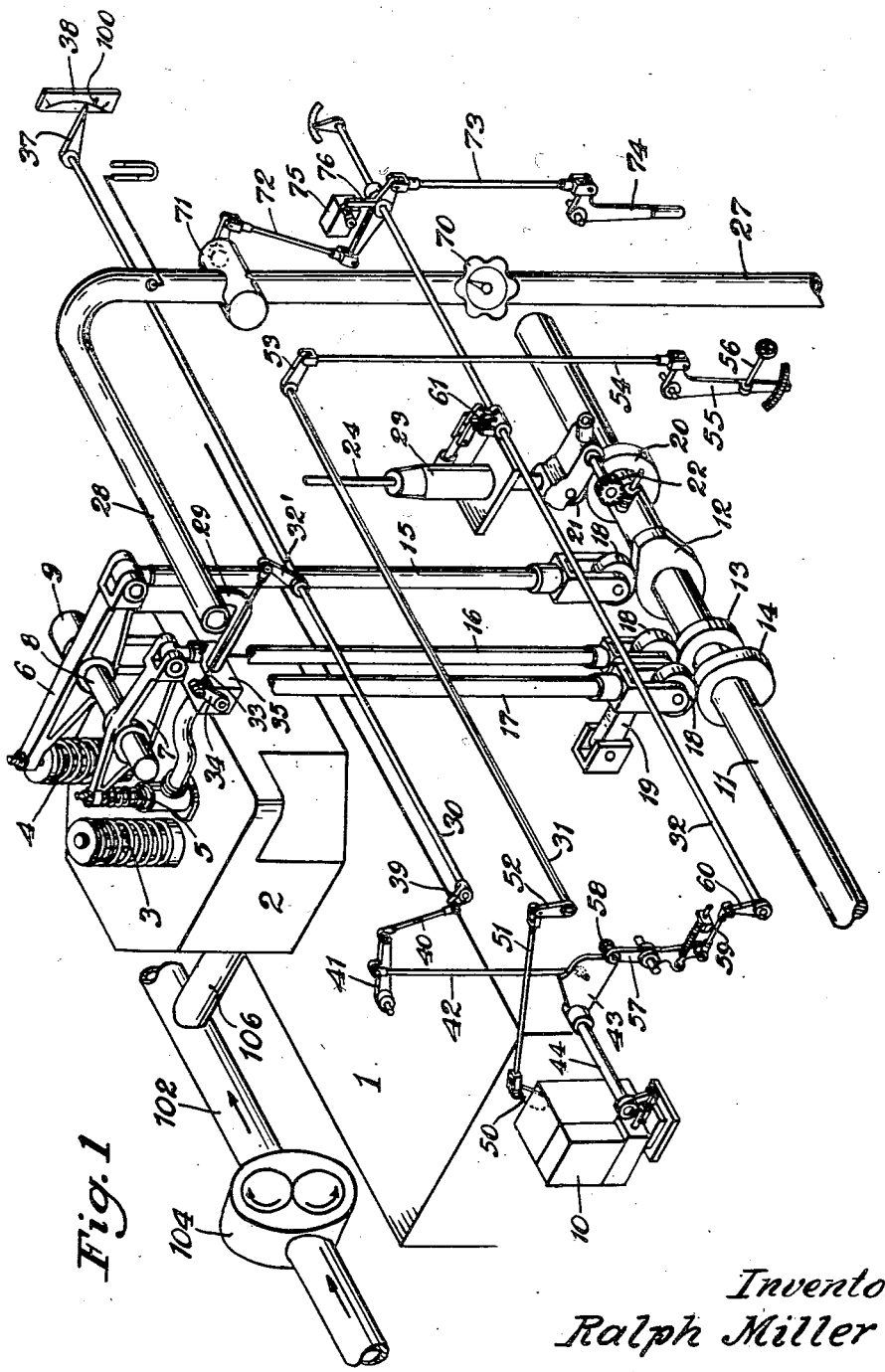

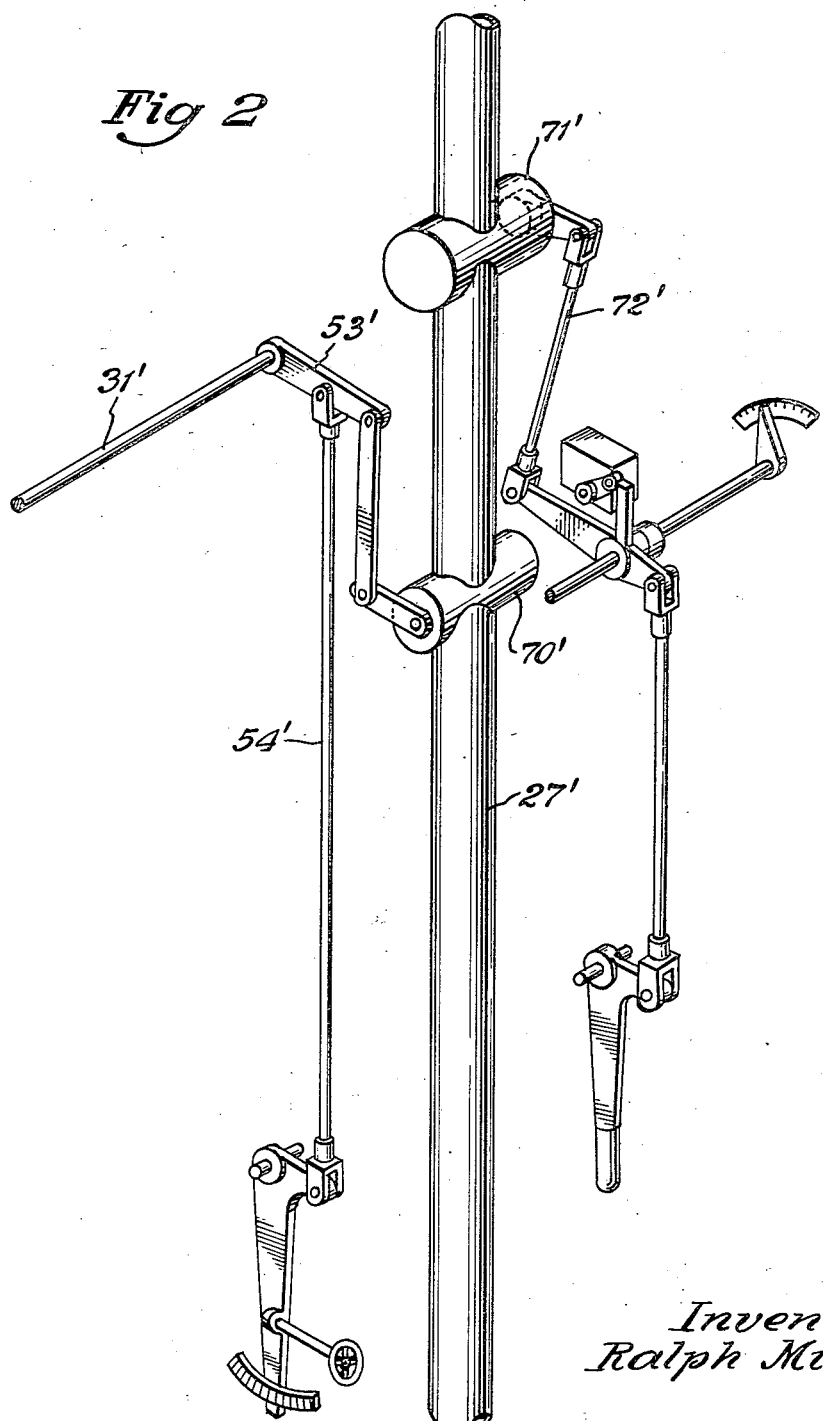

United States Patent Office 2,781,030
Patented Feb. 12, 1957

2,781,030

DUAL FUEL VARIABLE SPEED ENGINE CONTROL

Ralph Miller, Milwaukee, Wis., assignor to Nordberg Manufacturing Company, Milwaukee, Wis., a corporation of Wisconsin Application February 10, 1954, Serial No. 409,317

8 Claims. (Cl. 123—27)

This is a continuation-in-part and an improvement over Serial No. 77,495, filed February 21, 1949, now abandoned.

My invention relates to a method of and apparatus for controlling the operation of a variable speed dual fuel internal combustion engine of the diesel or pressure ignition type. Oil fuel or gas fuel, or both, may be burned in engines of this nature, and my invention has for one object an arrangement whereby the supply of gas may be controlled by the engine governor throughout the entire range of governor movement, but the supply of oil is controlled by the engine governor throughout only half of the range of governor movement. A constant quantity of pilot oil is supplied during the other half of the range of governor movement as the load varies.

Such an engine is supplied with air under pressure for scavenging and combustion, and any suitable scavenging blower or the like may be used for this purpose. The engine with which my invention is intended to be used or applied is one in which the engine itself supplies its own air. In other words, the engine drives a scavenging pump or blower or the exhaust gases drive a turbo-blower, and the quantity and pressure of the air vary with the speed and load on the engine.

The governor can be manually set to control or govern the engine at any desired speed, and the speed setting can be changed by the operator. Once the speed has been selected and set by the operator, the governor moves to control the fuel supply to maintain the engine speed within very narrow limits as the load varies.

An object of my invention is a dual fuel internal combustion engine of the combustion ignition type having a gas operating range and an oil operating range. The gas operating range is on the higher load side of the governor movement and when the load increases to a point such that the gas is insufficient to maintain the speed and carry the load, or in the event of a failure of gas supply, then the governor goes down into the oil operating range. The engine is adapted to operate under conditions of varying load and speed, and varying amounts of fuel are supplied to the engine in accordance with the load. During the gas operating range, the amount of gas fuel being supplied is varied and a quantity of pilot oil is also supplied. During the oil operating range, the amount of oil fuel being supplied is varied. In addition, the pressure of the gas fuel supplied to the engine is varied in accordance with the speed of the engine.

My invention is illustrated more or less diagrammatically in the accompanying drawings, in which:

Figure 1 is an isometric view of the outside of an engine with the elements of my invention associated therewith; and Figure 2 is a view similar to Figure 1 showing a modified form of my invention.

An engine block of the usual type is indicated at 1. It has a removable cylinder head 2, in this case illustrated as a separate head for each cylinder though a cylinder head for a multiplicity of cylinders might be used. 3 is an intake valve, and 4 an exhaust valve, and 5 a gas valve, all associated with the single cylinder head. All three of these valves are actuated by rocker arms 6 and 7 rotating on the rocker shaft 8 in a bracket 9 on the cylinder head. The arm 6 actuating the intake valve is omitted for clearness, and the injection nozzle for oil is omitted from this view though of course it will be understood that it will be present in a working cylinder head.

10 is a governor and 11 a cam shaft, both of them being driven from the engine crank shaft in any suitable manner not here illustrated. 12 is the exhaust cam, 13 the gas valve cam and 14 the intake valve cam, all three of them on the cam shaft 11. Push rods 15, 16 and 17 having cam rollers 18 at their lower ends are actuated respectively by the cams 12, 13 and 14 to actuate the exhaust valve 4, the gas valve 5 and the intake valve 3. 19 is a guide link, there being one associated with each of the cam rollers 18. 20 is the oil injection cam on the cam shaft 11. It is engaged by a roller 21, the position of which may be adjusted by means of the worm and gear assembly 22 to vary the operation of the oil injection pump 23 which, through a conduit 24, supplies oil for combustion under pressure to the injection nozzle in the cylinder head.

The details of the exhaust passages and scavenging air manifold associated with the cylinder head are omitted except that the manifold is shown schematically at 102 with the usual scavenging blower at 104 and a connection 106 leading to the inlet valve 3 for each cylinder, the blower being driven from the engine by any suitable drive connection. 27 is a gas supply pipe which supplies gas under pressure for combustion, to the gas manifold 28, the manifold supplying gas to each cylinder head through conduits 29. In normal engine operation it is essential that the pressure in the gas manifold be somewhat higher than the pressure of the scavenging air.

30 is the fuel gas control shaft, 31 the speed control shaft, 32 the fuel oil control shaft, all rotatably mounted in suitable brackets on the engine. A lever 32' which, by a link 33, is connected to a lever 34 on the gas regulating valve housing 35 is keyed to the gas control shaft. The effective length of this link 33 may be adjusted to change the response of the gas control valve in the housing 35 to the angular movement of the gas control shaft 30.

At the outboard end of the gas control shaft 30 is a pointer 37, which travels over an indicator dial 38, the purpose of which will hereinafter appear. The gas control shaft 30 is actuated by the lever 39, link 40, lever 41 and link 42 from the plate-cam 43 on the governor shaft 44, the governor shaft, of course, rotating in accordance with the governor response to engine load. The link 42 is pivoted on this plate-cam 43 so that governor movement always produces the same angular movement of the gas control shaft 30.

The speed control shaft 31 is connected with a speed control lever 50 on the governor housing 10 by link 51 and lever 52. At the other end of the speed control shaft is a lever 53 and link 54 which is pivoted on a bell crank lever 55, the position of which may be manually adjusted and set by means of the hand wheel 56 so that the engine speed, controlled by the governor, may be adjusted, the governor being set by the operator for any desired speed.

The fuel oil control shaft 32 is controlled by the governor plate-cam 43 through the rock lever 57, having a cam roller 58 engaging the plate cam. The cam is in part cylindrical so that within that part of its rotation called the gas operating range the roller does not move radially and thus there is no change in the angular position of the shaft 32 within this gas operating range, this being half of the governor plate-cam movement. In the other half of its movement, when the plate-cam has rotated in a clockwise direction into the oil operating range, movement of the plate-cam causes angular movement of the lever 57 and so affects the fuel oil control shaft 32. The lever 57 is connected by a link 59 and lever 60 to the fuel oil control shaft 32, and the shaft 32 is connected by link and lever combination 61 to the pump 23 to vary, in the usual way, the pump output whereby the speed and load of the engine is controlled under oil governing condition, so that when the governor moves through its governor travel, it affects only the gas, because during the time that the plate-cam is in its upper position, its movement controls the gas control shaft 30 and has no effect on the fuel oil control shaft 32. Whereas, when the cam has moved further in a clockwise direction to the oil operating range, then movement of the cam controls both the fuel oil control shaft and the gas control shaft.

In Figure 1, 70 is a manual gas control valve provided with a dial so that the operator may set the desired amount of gas entering the gas manifold. 71 is a gas shut-off valve connected by levers and linkage, through the linkage and lever 73 to the control lever 74, and pivoted on the fuel oil control shaft 32 through a claw coupling. 75 is a limit switch adapted to be actuated by a finger 76 on the shaft 32 to control any suitable alarm, if desired.

An operating engine would, of course, have a number of safety mechanisms by which the engine would close down automatically in case of fuel failure, and by which the gas and oil controls are interlocked so that the engine cannot be started, or rather, an effort cannot successfully be made to start it, when something is out of order. These form no present part of my invention and are, therefore, not illustrated or discussed. One purpose of the adjustment 22, by which the lead of the cam controlling the pump is controlled, is to enable the engine to be specially adjusted for only oil fuel operation.

It will be understood that with the parts as indicated, the engine is started by first rotating the lever 74 to move the fuel oil control shaft 32 into starting position; then when the engine is turned over by any suitable starting means, air and oil are supplied to the engine as it picks up speed. Then the lever 74 is further rotated into the running position, the gas supply is manually adjusted by valve 70, the valve 71 being now opened, and the engine will then run with the cam 43 in the position shown, so that the governor movement of the plate-cam 43 affects only the gas supply. The oil is independent of governor movement, because the oil lever cam roller 58 engages the cylindrical part of the plate-cam 43 and cam movement has no effect. If, however, the load should increase to a point where the gas was unable to carry the load, as might be the case if the gas supply fell off or gas pressure reduced, then the engine speed would reduce slightly so that the cam 22 controlled by the governor would rotate in a clockwise direction, bringing the cam roller 58 into engagement with the diminished portion of the plate cam 43 under which circumstance the fuel control shaft 32 would be rotated to increase the pump output from the pilot amount of oil to an operating value. This situation would continue, an increased amount of oil being fed to the engine, as long as the load remained such that the roller 58 was on that diminished part of the cam which calls for oil operation.

When assembled, the engine will be operated on gas with pilot oil and the speed will be adjusted at the desired speed which determines the pressure of the scavenging air, then the amount of gas will be adjusted so as to produce maximum efficiency at the obtained scavenging air pressure for maximum load. The point at which the gas adjustment balances properly with the supercharged air for scavenging, for maximum efficiency of operation, will be set and determined and marked on the dial 38 for, for instance, 300 revolutions per minute. Under these circumstances, the engine may operate throughout a reasonable speed variation under change in load, the governor controlling it, so that the control is effective on the gas through about half the governor travel without in any way affecting the oil.

If the operator now wants to run the engine at lower speed, he can do so by adjusting the speed controlled by the governor, but when he does this, he decreases the effective area within which the governor works on gas alone. So, in order to provide for smooth and satisfactory operation and to resume or return to the proper relationship between gas pressure and the reduced scavenging pressure resulting from the lower speed, the operator must again make the manual adjustment of valve 70 until, at the desired speed, the pointer 37 returns to the indicated maximum point 100 on the dial 38, at which time speed variation is properly controllable by the governor and a maximum proportion of governor movement remains available.

In the case of the indicator pointer on the gas regulating shaft, there is on the dial a point which indicates approximately 90% opening of the gas valves. This means that when the speed or load is changed to a new condition, by manipulating the manual valve 70, full governor stroke may be utilized for governing the engine on gas, whether the load is ⅛, ¼, or any given load. This gives inherent stability and speed regulation to the engine that could not otherwise be acquired.

In Figure 2, I have shown a modification of Figure 1. A gas throttling or regulating valve 70' is shown in the gas inlet pipe 27'. The hand wheel mechanism 54', connected to the governor for varying the speed of the engine, is connected to the valve 70' through an extended lever 53' and a link, this lever being mounted on the speed control shaft 31' in a manner similar to Figure 1. A gas shut-off valve 71' is positioned above the regulating valve 70' and is controlled, as before, by the manually operable linkage mechanism 72'. The other details of mechanism and structure and the broad operating principles are the same as before.

In this modification, when the operator changes the speed of the governor by manipulation of the manual hand wheel mechanism 54', the gas throttling or regulating valve 70' will also be varied at the same time, so that the pressure of the gas being supplied to the engine will vary directly in accordance with the speed. Of course, a suitable adjustment could be provided in the linkage mechanism shown between the valve 70' and lever 53' in Figure 2 as it is desirable that the pressure of gas being supplied to the engine always be at least slightly greater than the pressure of the scavenging air.

It will be realized that whereas I have described and illustrated a practical and operative device, nevertheless, many changes may be made in the size, shape, arrangement, number and disposition of parts without departing materially from the spirit of my invention. I wish, therefore, that my showing be taken as in a large sense illustrative or diagrammatic rather than as limiting me to my precise showing.

The use and operation of my invention are as follows:

My engine is supplied with air under pressure for scavenging and combustion, and any suitable means may be used to provide this air. The engine to which my invention is intended to be applied is one wherein the engine itself, either by exhaust turbo-blower or pump or the like, supplies its own air, and so the amount and pressure of the air varies with the speed of and load carried by the engine.

Such engines are, under normal operating conditions, supplied with fuel gas which, when mixed with the air does not ignite reliably under compression. To overcome this difficulty, such an engine is supplied with a minimum amount of pilot fuel oil which ignites easily under compression and inaugurates the burning of the gas-oil mixture.

Gas is a cheaper fuel than oil under many circumstances, and so the less oil burned, the better. However, occasion will occur where the engine must run on oil or must run on gas and more than the minimum amount of pilot oil.

The engine is controlled, as is usual with diesel engines of this type, by a governor 10, and when the engine runs on gas the governor controls the gas in consonance with variation in load to maintain the engine speed in the selected speed range. The pilot oil is not governed, the engine burns just enough pilot oil on every cycle to inaugurate combustion of the gas, and the amount of pilot oil does not usually vary with load or speed.

When the engine is burning oil alone, the oil supply must be governed to compensate for change in load, and if oil and gas are burned, that is more oil than the mere pilot amount, then the governor controls the oil and the gas in consonance to maintain the governed speed.

The governor can be manually set to control or govern the engine at any desired speed and such setting can be changed at the will of the operator. As load varies, the governor moves to control the fuel supply to maintain the engine speed within very narrow limits.

In my herein disclosed arrangement, the gas supply is controlled by the governor throughout the entire range of governor movement but the oil supply is controlled by the governor throughout only one-half of its range of movement. The pilot oil, which does not vary in amount with variation in load, is supplied during the remainder or other half of the range of governor movement without governor control.

That part of governor movement during which oil is controlled is called the oil operation range and that part of governor movement during which the oil is not controlled is called the gas operation range. Within the gas operation range, only pilot oil is burned, and the engine is so adjusted that the gas operation range is on the higher load side of the governor movement within the selected load range and only if the load increases to a point such that gas with pilot oil is insufficient to maintain the speed and carry the load does the governor go down into the oil operation range, in which range if gas is still supplied the engine burns both oil and gas or if gas is shut off the engine burns only oil.

Increase in load, therefore, beyond the limit of the gas operation range causes the governor to move into the oil operation range and this causes an increase of oil supply above the pilot amount and causes the governor to resume control of the oil supply. The engine then burns both gas and a substantial amount of oil, enough over and above the pilot amount to aid the engine to carry the additional load.

It is important that the gas pressure be slightly greater than the scavenging air pressure and there is an optimum relationship between these pressures. The gas pressure in the supply main is normally much higher than the pressure desired at the engine, and so pressure reducing means are used. Manual control means are provided between the pressure reducer and the engine to permit accurate gas pressure control.

The gas supplied to the system from any suitable outside source is normally maintained at constant pressure. The operator may, by setting the manual control valve 70, adjust the pressure of the gas as it starts toward the engine at any desired point below or susbtantially up to the pressure at which the gas reaches the system and that manual adjustment is independent of engine operating variations. In that respect, such adjustment is unlike the scavenging air pressure which does not vary in consonance with engine operating variations. And so to insure a satisfactory engine operation, the gas pressure is manually adjusted to insure a proper relation to the scavenging air pressure. Slight variations in engine speed within the narrow range of governor speed variation are not sufficient to upset this equilibrium once it has been established.

An indicator will show the position of the gas governing means controlled by the governor for optimum air-gas pressure relationship in the desired speed range. This may take the form of a pointer on the gas control shaft and a dial with means for marking on the dial the point at which optimum conditions prevail.

The engine will be so operated, so adjusted, that this optimum position will be located approximately at the half-way point in governor movement between the gas operation range and the air operation range, and as load and speed vary, the governor will move back and forth between this median point and the other end of the gas operation range. If for any reason, such as a decrease in the gas supply or an excessive increase in load, gas is not able to carry the load, the speed will fall slightly and the governor will move down into the oil operation range, perhaps further increasing gas supply, but more important, increasing the amount of oil above the pilot amount to enable the engine to carry the load.

This engine and the control lends itself well to use, for instance, on an oil pipe line where slight changes in speed are of little consequence and also to a situation where it frequently may happen that the operator desires to operate the engine at a speed substantially below the maximum speed for which the engine was designed.

If without further change we try to operate an engine which will run between 150 and 300 revolutions, the governor might control the engine between 150 revolutions, its low speed, and 300, its high speed. If, for example, the engine is to operate at a lower speed and the governor is set to run, for example, at 250 revolutions, the governor never gets up to 300 revolutions because of the governor setting. The differential between the gas and air pressures is now a new value, the low speed resulting in a substantially reduced air pressure. This is compensated for by reducing the gas pressure manually so as to return to the original differential between gas and air pressure. In other words, with the engine running at 250, the gas pressure is decreased until the indicator has returned to the optimum point it occupied when the engine was set for 300 revolutions. The governor now is able to move within the original range at the lower speed and the governor will control speed throughout the entire gas operating range and will be able to control the gas supply throughout the entire gas operating range and the oil supply throughout the entire oil operating range just as before. In other words, by this adjustment of gas pressure, I have in effect increased the range through which the governor operates at any one speed and have avoided the reduction in governor travel or amplitude of operation which normally results from a decrease in speed.

For instance, in the case of a pipeline engine pump combination, an engine might be designed to run at 300 revolutions per minute, at a certain torque. Perhaps the operator wants to run it at 150 revolutions. As above discussed, by manipulating the gas supply and the differential between gas and air, he is able to have the engine run under control of the governor throughout the entire governor range for the gas operated part of the governor movement. If, now, he wants to decrease the torque while maintaining constant speed at this lower speed, he still may do that because all he has to do is to continue his manipulation of gas pressure so as to maintain the indicator at the index point determined in the first instance, at the desired speed and torque, when the engine was set up and operated at maximum speed and maximum torque. Under these circumstances, also, the engine works under full governor control through just as wide a range as when working at maximum torque and maximum speed.

On an engine of this type stability is important. A relationship between the governor and engine operation must be established and maintained such that the governor will be able to control the engine speed accurately within its operating range. By my invention I have cut the governor range in half so that half of it controls oil operation and half of it controls gas operation, and at the maximum speed and torque I am still able to get adequate governor control. But a difficulty arises when speed or torque are reduced below the maximum because, under ordinary circumstances, only a part of the remaining part of the governor movement is available to effect control gas. By manipulation of the relationship between gas pressure and scavenging pressure, we are able, by manual adjustment, to bring the governor back into a range where all the available governor travel is effective to control the speed of the engine.

Speed droop is not important on an engine of this sort. The governor 10 may well be set at which is known as zero speed droop and the engine will be controlled by the two-stage plate-cam 43 which controls the oil supply. Half of the cam is generally cylindrical and of such radius that a lever supported roller 58 engaging it will hold the oil controls in such position as to cause the injection of pilot oil only. When the governor drops from the gas operating range to the oil operating range, the roller 58 engages a part of the cam, the radius of which changes, so that as cam movement continues, the fuel oil control shaft 32 controlling the pump 23 rotates to increase pump displacement so that substantial quantities of fuel oil will be supplied.

This is all done without any change in the governor controlled relationship between the engine and the gas supply, because the gas valve is controlled by the shaft 30 which is directly connected to the governor so that governor movement throughout its entire range controls the gas valve 35, and so, the gas supply. Thus, in one part of the governor movement gas only is governor controlled, and in another part of the governor travel both gas and oil are governor controlled. By manipulation of the gas pressure at any selected speed, the point in governor travel where the change-over from governor control of gas alone to governor control of both gas and oil occurs may always be kept at the center of governor travel so that maximum governor availability and accuracy may be had at all speeds.

The operation of the modification shown in Figure 2 is substantially the same, except that when the operator varies the speed by manipulation of the hand wheel mechanism 54', at the same time the gas regulating valve 70' is changed, the pressure of the gas supplied to the engine is automatically varied. Even though I have shown the linkage mechanism for effecting this automatic gas pressure variation in speed in Figure 2 as a rigid linkage, it should be understood that any suitable adjustment could be provided so that the operator could set the linkage relationships so that in operation the gas pressure being supplied to the engine would always exceed the scavenging air pressure by a desired amount, and the mechanism as shown is schematically intended to represent this particular operating condition.

I claim:

1. In a dual fuel internal combustion engine of the compression ignition type, adapted to operate under conditions of varying load and speed, the engine having a governor with a gas operating range and an oil operating range in the event of a substantial gas pressure failure, a gas supply line for supplying gas fuel to the engine from a gas fuel source, a pump for supplying oil fuel to the engine from an oil fuel source, a gas fuel control mechanism associated with the governor for varying the amount of gas fuel being supplied to the engine in accordance with the load during the gas operating range, an oil fuel control mechanism associated with the governor for varying the amount of oil fuel being supplied to the engine in accordance with the load during the oil operating range, manually operable means associated with the governor for varying the speed of the engine, and means for automatically varying the pressure of the gas supplied to the engine as the manually operable means varies the speed.

2. The structure of claim 1 wherein said last-mentioned means includes a valve in the gas supply line, and a linkage connected to it and to the manually operable means so that, as the speed of the engine is varied in response to manual selection, the valve in the gas supply line will automatically vary the pressure of the gas being supplied to the engine.

3. In a dual fuel internal combustion engine of the compression ignition type, adapted to operate under conditions of varying load and speed, the engine having a governor with a gas operating range and an oil operating range in the event of a substantial gas pressure failure, a blower for supplying scavenging air to the engine at a pressure that varies with the speed of the engine, a gas supply line for supplying gas fuel to the engine from a gas fuel source, a pump for supplying oil fuel to the engine from an oil fuel source, a gas fuel control mechanism associated with the governor for varying the amount of gas fuel being supplied to the engine in accordance with the load during the gas operating range, an oil fuel control mechanism associated with the governor for varying the amount of oil fuel being supplied to the engine in accordance with the load during the oil operating range, manually operable means associated with the governor for varying the speed of the engine, and means for automatically varying the pressure of the gas supplied to the engine as the manually operable means varies the speed, said last-mentioned means including a valve in the gas supply line and a linkage connected between it and the manually operable means so that as the speed of the engine is varied in a manually selected manner, the pressure of the gas being supplied to the engine will also vary, the gas fuel control mechanism, the valve in the gas supply line, the manually operable speed varying means, and the linkage being constructed and arranged with relation to the engine so that at all speeds the gas pressure will always exceed the pressure of the scavenging air.

4. In a dual fuel internal combustion engine of the compression ignition type, adapted to operate under conditions of varying load and speed, the engine having a cylinder, a piston movably mounted in the cylinder, a scavenging blower for the engine, a governor associated with the engine having a gas operating range and an oil operating range, means for supplying gas fuel to the cylinder, means for supplying oil fuel to the cylinder, means for varying the amount of fuel supplied to the cylinder in accordance with the load, said last-mentioned means including means for varying the amount of gas fuel supplied to the cylinder during the gas operating range, means for varying the amount of oil fuel being supplied to the cylinder during the oil operating range, means associated with the governor for varying the speed of the engine, and separate means for automatically varying the pressure of the gas fuel supplied to the cylinder as the speed is varied by said last-mentioned means, said last mentioned means being constructed so that the gas and scavenging air pressures will be maintained in the same general relationship at all loads.

5. In a dual fuel internal combustion engine of the combustion ignition type adapted to operate under conditions of varying load and speed with a gas operating range and an oil operating range, the engine having a cylinder, a piston movably mounted in the cylinder, a scavenging blower for the engine, means for supplying gas fuel to the cylinder during the gas operating range in amounts that vary in accordance with the load, means for supplying oil fuel to the cylinder during the oil operating range in amounts that vary in accordance with the load, and separate means for varying the pressure of the gas fuel supplied to the cylinder in accordance with the speed of the engine, said last mentioned means being constructed so that at all speeds the gas pressure will always exceed the scavenging air pressure.

6. A method of operating a dual fuel internal combustion engine of the compression ignition type under conditions of varying load and speed, the engine having a gas operating range and an oil operating range, including the steps of varying the amount of gas fuel being supplied to the engine during the gas operating range in accordance with the load on the engine, varying the amount of oil fuel being supplied to the engine during the oil operating range in accordance with the load on the engine, and separately varying the pressure of the gas fuel being supplied to the engine automatically in accordance with the speed of the engine.

7. A method of operating a dual fuel internal combustion engine of the compression ignition type under conditions of varying load and speed, the engine being adapted to operate from a relatively constant pressure source of gas fuel and having a gas operating range and an oil operating range in the event of a substantial reduction in the pressure of the gas fuel from the relatively constant pressure source, including the steps of varying the amount of gas fuel being supplied to the engine during the gas operating range in accordance with the load on the engine, varying the amount of oil fuel being supplied to the engine during the oil operating range in accordance with the load on the engine when the pressure of the gas fuel from the relatively constant pressure source is substantially reduced, and separately varying the pressure of the gas fuel being supplied to the engine during the gas operating range automatically in accordance with the speed of the engine.

8. A method of operating a dual fuel internal combustion engine of the compression ignition type under conditions of varying load and speed, the engine having a gas operating range and an oil operating range, including the steps of supplying scavenging air to the engine at a pressure that varies at least with the speed, varying the amount of fuel oil supplied to the engine in accordance with the load during the oil operating range, varying the amount of fuel gas, with a quantity of pilot oil being supplied to the engine, in accordance with the load on the engine during the gas operating range, and automatically throttling the gas fuel supply so as to vary its pressure in accordance with the pressure of the scavenging air supplied to the engine.

References Cited in the file of this patent

UNITED STATES PATENTS

| | | |
|---|---|---|
| 2,400,219 | Barnaby et al. | May 14, 1946 |
| 2,489,405 | Doyle | Nov. 29, 1949 |
| 2,509,960 | Calhoun | May 30, 1950 |
| 2,544,978 | Blessing et al. | Mar. 13, 1951 |